United States Patent Office 2,808,444
Patented Oct. 1, 1957

2,808,444
1-CHLORO-4-IODO-2-BUTENE

Howard Johnston, Concord, Calif., assignor to The Dow Chemical Company, Midland, Mich., a corporation of Delaware No Drawing. Application June 7, 1954,
Serial No. 435,078

1 Claim. (Cl. 260—654)

The present invention is directed to 1-chloro-4-iodo-2-butene of the following formula

$ClH_2C-HC=CH-CH_2I$

This novel compound is a viscous liquid which is somewhat soluble in many organic solvents and of very low solubility in water. The compound is particularly valuable as a fumigant for the control of any common bacteria, fungal and insect pests and is adapted to be employed as an active toxic constituent of compositions for the control of such organisms.

The novel 1-chloro-4-iodo-2-butene may be prepared by mixing or otherwise blending 1,4-dichloro-2-butene with an alkali metal iodide such as sodium or potassium iodide. The contacting of the reagents conveniently may be carried out in an inert organic solvent such as acetone, methylethyl ketone, or ethanol. Good results are obtained when one molecular proportion of 1,4-dichloro-2-butene is reacted with at least one molecular proportion of the alkali metal iodide. The reaction is somewhat exothermic and takes place smoothly at temperatures of from 15° to 60° C. The temperature may be controlled by regulating the rate of contacting the reactants and/or by the addition and subtraction of heat as required. Following the reaction the desired product may be separated in conventional manner such as washing with water, decantation and fractional distillation under reduced pressure.

In a representative operation, 312 grams (2.5 moles) of 1,4-dichloro-2-butene was added with stirring to a cooled solution containing 550 grams (3.66 moles) of sodium iodide in 2 liters of acetone. Stirring was thereafter continued for 8 hours at a temperature of 25° C. and the reaction mixture thereafter set aside overnight at room temperature to complete the reaction. The reaction mixture, which was an oily liquid, was then washed with ice water, dried, and the dried product fractionally distilled under reduced pressure to separate a 1-chloro-4-iodo-2-butene product as a viscous liquid. The latter had a boiling point of 69–70° C. at 4.5 milliliters pressure, a refractive index n/D of 1.5854 at 25° C. and a density of 1.8338 at 25/25° C.

The new 1-chloro-4-iodo-2-butene is effective as a fumigant and of particular value for the control of soil-dwelling fungi and nematodes. For such use, the compound may be dispersed on an inert finely divided solid and employed as a dust. In other procedures the compound may be dispersed in a liquid carrier such as water or a petroleum distillate and the resulting compositions distributed in soil by injection or drilling techniques. Suitable concentrations of the compound in soil are from about 5 to 200 parts by weight per million parts by weight of the soil.

1-chloro-4-iodo-2-butene has been employed as a space fumigant for the control of *Rhizopus nigricans* and *Saccharomyces cerevisiae*. In representative operations, 100 percent controls of these organisms have been obtained at concentrations of 0.1 pound of 1-chloro-4-iodo-2-butene per 1000 cubic feet of space.

I claim:
1-chloro-4-iodo-2-butene.

References Cited in the file of this patent
UNITED STATES PATENTS

| | | |
|---|---|---|
| 2,057,044 | Meisenburg et al. | Oct. 13, 1936 |
| 2,453,089 | Morey et al. | Nov. 2, 1948 |